May 28, 1963

R. B. NEVIN 3,091,229

MEANS AND METHOD FOR IMPROVING COMBUSTION
IN INTERNAL COMBUSTION ENGINES

Filed Aug. 7, 1961

INVENTOR.
ROBERT B. NEVIN
BY George W. Wilson
ATTORNEY.

United States Patent Office 3,091,229
Patented May 28, 1963

3,091,229
MEANS AND METHOD FOR IMPROVING COMBUSTION IN INTERNAL COMBUSTION ENGINES
Robert B. Nevin, Lakewood, Calif.
(4325 Pepperwood St., Long Beach, Calif.)
Filed Aug. 7, 1961, Ser. No. 129,904
13 Claims. (Cl. 123—119)

This invention relates to a method and means for improving the combustion of gasoline fuels in internal combustion engines and to the reduction of deleterious elements present in the exhaust of said engines, particularly those elements most responsible for the formation of "smog."

A great amount of work has been done in areas having heavy concentrations of automobiles and atmospheric conditions of much sunshine and temperature inversion, on the subject of automobile exhausts since it is now considered proved that automobile exhaust is a major cause of "smog," which is an atmospheric condition manifesting eye irritation, characteristic damage to vegetation and odor, and reduction in visibility. Other sources of air pollution such as the emission of smoke from the stacks of factories of course add to reduction of visibility but are not considered to be a major factor, in most areas, of the deleterious effects.

As a result of the work done on the problem of reducing "smog" it is considered that hydrocarbons and oxides of nitrogen emitted by gasoline engines and the action of strong sunlight on the oxides of nitrogen are a major cause of smog.

The emission of hydrocarbons is in part due to the valve timing of modern highspeed engines in which the exhaust valve ports open a fraction of a cycle before completion of the firing stroke and in part due to incomplete combustion during the incessant deceleration and acceleration of automobiles in city driving the fuel mixture at such times being faulty as also during idling of the engines.

A further cause of imperfect mixtures of fuel and air is that the mixture leaves the carburetor as a wet mist and although efforts are commonly made to heat the mixture and more thoroughly disperse the fuel in air by heating the inlet manifold of the engine, the crude means employed have little effect.

A good standard by which the efficiency of means taken to improve the mixture fed into an automobile engine and indicating the completeness of combustion therein with consequent reduction in hydrocarbons emitted in the exhaust, is the miles per gallon obtained from the automobile.

I have discovered that by injecting a suitable additive containing finely ground copper oxide into the stream of carbureted air sucked through the device and subjecting the mixture to heat and violent changes in pressure and direction of flow the amount of nitrogen oxides in the mixture are largely broken down into nitrogen, an inert and harmless gas, and hydrogen which is also harmless and passes out of the exhaust as water vapor, thus the most undesirable of the products of combustion of gasoline in the engine cylinders is greatly reduced and the photosynthesis of pollutants into "smog" is therefore reduced.

An object of the invention is to provide a fuel mixture atomizing device to which a chemical agent can be supplied and by which the added agent and fuel mixture are intimately mixed before being supplied to the induction manifold of an internal combustion engine.

A further object of the invention is to provide a gasoline fuel atomixing device positioned between the carburetor and inlet manifold of an internal combustion engine, a chemical agent being introduced into said device and intimately mixed with the fuel mixture by high speed flow of the fuel mixture and chemical through chambers and passages within said device and subjecting the fuel mixture and added agent to variations of pressure and directions of flow ensuring complete atomization of the fuel mixture and diffusion of said agent therethrough.

Another object of the invention is to provide a device as above described in which the fuel mixture and added agent are drawn by the engine suction through passages of varying cross section, said passages being located in a zone of the device heated to a temperature sufficient to ensure that the fuel mixture is substantially fully evaporated and dry before entry into the engine.

A still further object of the invention is to feed fumes from the engine crankcase to the device described, below the heated area thereof, a conduit connecting the crankcase and the device being controlled by a valve connected to the throttle control or accelerator of the engine and being effective to supply extra air to the mixture flowing through the device when the engine is decelerated or idling.

Another object of the invention is to provide a device interposed between the carburetor and inlet of an internal combustion engine which is effective to break up the particles of liquid fuel in the mixture of fuel and air leaving the carburetor so that a greater amount of air may be incorporated with the fuel to obtain maximum efficiency of combustion and thus obtain an improved mileage per gallon of fuel.

Still further objects and features of the invention will become apparent from the following description read with the accompanying drawings.

A preferred embodiment of the invention is illustrated in the drawings showing the device mounted between the carburetor and inlet manifold of a well known automobile V-8 engine but it is pointed out that the description and drawings are for illustrative purposes only since various changes may be made by those skilled in the art without departing from the scope of the invention as defined in the appended claims.

Figure 1:
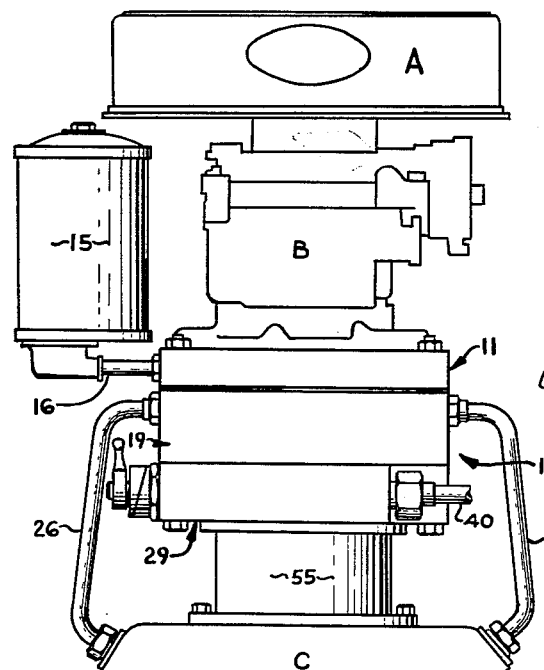
FIGURE 1 is a view in front elevation of the upper portion of the intake manifold of an internal combustion engine with the device of the invention mounted thereon.
Figure 2:
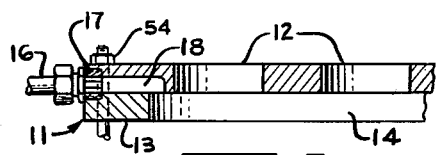
FIGURES 2, 3 and 4 are fragmentary views drawn on a larger scale and in central vertical section through the device, showing a plurality of plates adapted to be clamped together.
Figure 3:
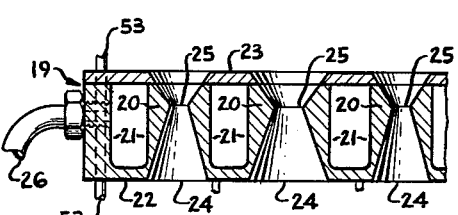
Figure 4:
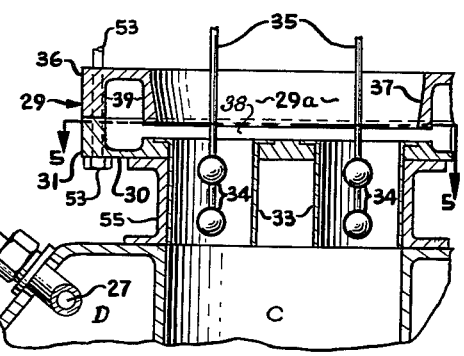

Referring now to FIGURE 1, A indicates the air cleaner, B the carburetor and C the inlet manifold of the engine, the manifold in this area being warmed by the exhaust manifold D (FIGURE 4) as is the case in some well known V type engines.

The device of my invention is indicated generally at 10 (as a housing) and comprises a top plate 11 provided with inlet ports 12 for the two-barrel carburetor indicated and with a depending peripheral rim 13 providing a first expansion chamber 14.

An additive such as a suspension of copper oxide or other chemical or mixtures thereof contained in a supply tank 15 is drawn into the expansion chamber 1A through a pipe 16 by the suction of the engine. An exchangeable nozzle 17 to which pipe 16 is connected delivers an additive such as a suspension into a passage 18 drilled into plate 11 and communicating with the expansion space 14.

Any chemical suspension, dispension or solution found suitable for the purpose of reducing the noxious components of the fuels burned in internal combustion engines, it is believed, would be most advantageously added to and thoroughly admixed with the carbureted air by the use of the device of this invention.

Plate 11 is clamped upon a treated mixture heating and atomizing plate 19 which is hollow and provided with a plurality of cylindrical stubs 20 extending between top and bottom of the hollow plate 19. The construction is such that all stubs 20 are surrounded by spaces 21 between the bottom 22 of the hollow plate 19 and the top plate 23 thereof. Each stub 20 is drilled with an axial convergent-divergent passage 24 extending from the upper to the lower surface of the heating plate 19. It will be noted that the passages 24 converge to a constricted throat 25 and then abruptly diverge providing a sharp peripheral juncture to the openings in the bottom of the plate and that the walls of the passages are imperforate.

The interior of plate 19 is heated by exhaust gasses flowing into the plate through inlet pipe 26 connected to the exhaust manifold with its opening 27 facing upstream of the direction of flow of the exhaust gas through the exhaust manifold. Exhaust gas flows out of the plate 19 through outlet pipe 28 connected between plate 19 and the exhaust manifold with its outlet (not shown) facing downstream of the flow of exhaust.

The lowermost plate 29 (see FIGURE 4) is formed to provide a second expansion chamber 29a into which fumes from the crankcase (not shown) are led to be incorporated in the treated fuel mixture.

Plate 29 is formed of a bottom member 30 with an upstanding rim 31 and with a lateral extension 32 along one side sufficiently thick to receive a valve later described. Outlet tubes 33 depend through holes through the bottom member 30 into the inlet manifold.

Preferably the gaseous mixture flowing downward through tubes 33 is caused to violently intermix by deflecting elements 34 mounted in the tubes on rods 35 depending from and screwed into the bottom of plate 19. A ring 36 is clamped upon the rim 31 of plate 29 and is provided with a depending peripheral lip 37 spaced from the outer wall of ring 36 and extending toward the bottom 30 but leaving a peripheral slot 38 which affords communication between the space 39 between lip 37 and the outer wall of ring 36.

Fumes from the crankcase which normally exhaust through the usual crankcase breather are drawn into the second expansion space 29a by the suction of the engine through pipe 40 which is connected between the crankcase or the usual breather tube and a valve controlled passage leading into the space 39.

Figure 5:
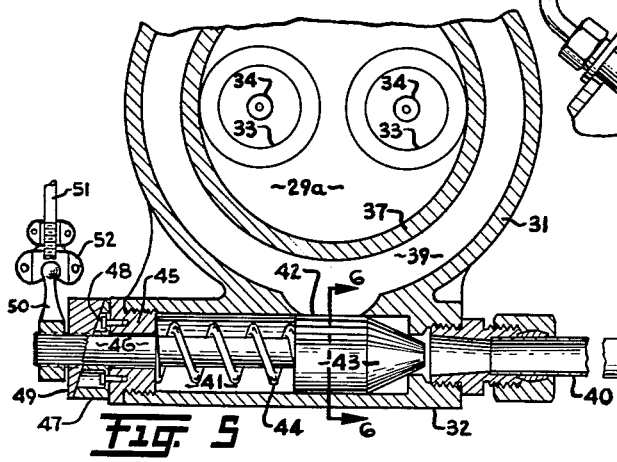
FIGURE 5 is a cross section on the line 5—5 in FIGURE 4.
Figure 6:
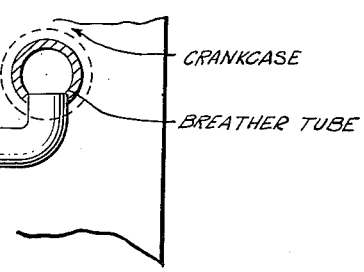
FIGURE 6 is a cross section on the line 6—6 in FIGURE 5, a valve head being omitted.

As shown in FIGURES 5 and 6 passage 41 is drilled in lateral extension 32 and a port 42 connects passage 41 and space 39. A conical valve 43 is mounted in passage 41 and in idling position cuts down flow of crankcase fumes and air from pipe 40 to port 42. Valve 43 is urged toward closed position by coil spring 44 mounted in passage 41 between the base of the conical valve 43 and a threaded stud 45 closing the end of passage 41. An operating rod 46 secured to the valve 43 and extends through an axial hole in stud 45. The outward end of rod 46 is connected by any suitable means to the throttle or accelerator control rod of the engine so that as the throttle is opened to increase the speed of the engine valve 43 will be increasingly opened by a pull on rod 46.

The means shown in FIGURE 5 for axially moving rod 46 in the opening direction are a cam 47 adjustably mounted by screws 48 on the head of stud 45 and a second cam 49 adjustably mounted on the fluted outer end of rod 46. Cam 49 is provided with an arm 50 (shown foreshortened in FIGURE 5) adjustably mounted on cam 49. Arm 50 is connected by a rod 51 having ball and socket connection 52 to arm 50 and connected to the throttle or acceleration rod (not shown) of the engine.

The plates of which the device is comprised are clamped solidly together by long bolts 53, extending through aligned holes in the several plates, and nuts 54.

The device is shown as mounted on the inlet manifold C by a stand-off sleeve 55.

*Operation*

It has been found in use on an old model automobile in the 100 H.P. class and using an inlet orifice of 1/16" to pass a copper oxide suspension into expansion chamber 14, that about 60% of the nitrogen oxide was eliminated from the exhaust when the heating and mixing plate 19 was at about 900° F. and about 80% was eliminated with plate 19 at about 1500° F.

The mixture of gasolene air and copper oxide suspension under the suction of the engine swirls violently in expansion chamber 14 and is drawn at high speed through the passages 24 which are heated by the exhaust bled off the exhaust manifold by tube 26 and returned to the manifold tube 28.

Good results have been obtained by circulating hot water from the engine cooling jacket by connecting tubes 26 and 28 thereto instead of to the exhaust manifold.

It will be noted that passages 24 are flared outwards from a restricted throat 25 at which the flared portions meet at a sharp angle subjecting the streams flowing therethrough at high speed to violent fluctuations of speed and pressure and turbulence in flowing over the sharp edge of the angle at the throat resulting in complete breaking up of the liquid droplets in the streams and heating the mixture.

The streams issuing from the passages 24 again are swirled and mingled in the expansion chamber 29a of plate 29 and joined by the fumes and air drawn from the crankcase through tube 40 and circumferential passage 39 by the suction of the engine.

Tube 40 may be connected to the usual crankcase breather tube (not shown) or to the crankcase, in either case air has access to tube 40 and valve 43 is set so that it does not completely close when the accelerator pedal is released so that the suction acting on the carburetor idling jet is reduced, thus reducing the flow of gasoline from the idling jet, preventing the unduly rich fuel mixture which has been found to contribute to the formation of smog to a significant degree.

The fumes emitted from the crankcase breather tubes of automobiles are a particularly undesirable contribution to "smog" since they carry oil as well as burned and unburned fuel leaking past the pistons, and it has been found that by introducing them into the fuel mixture below the heating plate 19 the undesirable constituents are largely burned in the engine, or combined with the chemicals added to form harmless vapors.

It is preferred to subject the mixture leaving expansion chamber 29a to turbulent flow which is effected by positioning the small spherical bodies 34 in the outlet tubes 33. The effect of the spherical bodies is to provide rapid changes in cross section of the outlet tubes thus setting up turbulence in the flow of the mixtures into the inlet manifold.

It will be noted that although the flow of the fuel mixture through the device is made turbulent, it is not restricted, so that the full volume of mixture is supplied to the engine but with the fuel thoroughly broken up so that much more air may be mixed with the fuel and more perfect combustion assured.

In proof of the latter assertion it has been found that the mileage per gallon obtained on an old model automobile fitted with the device has been increased to about double and would be largely increased when fitted to more modern automobile engines.

It is believed that the addition of copper oxide to the carbureted air under conditions of heat and thorough mixing provides a catalytic effect resulting in the breaking up of oxides of nitrogen present in the fuel into nitrogen and hydrogen greatly reducing the amount of nitrogen oxides in the engine exhaust.

The improved efficiency of combustion achieved also results in a greatly reduced emission of unburned hydrocarbons in the engine exhaust. This result is believed to be due to the more complete breaking up of the minute droplets of the fuel mixture as the mixture is drawn at high speed through the device by the suction of the engine.

A preferred embodiment of the method of and means for improving the combustion of hydrocarbon fuels in internal combustion engines and reducing harmful elements in the exhaust thereof has been described and illustrated. The described method and means for carrying it into effect have given good results under test but it is to be understood that various modifications may be made without departing from the scope of the invention as set forth in the appended claims.

I claim:

1. A device effective to provide improved combustion in internal combustion engines, comprising:
   a housing interposed in the conduit between the carburetor and the engine inlet, and through which the combustible mixture is drawn by the suction of the engine;
   an expansion chamber in the housing into which said combustible mixture expands;
   a heating and mixing section in said housing through which said combustible mixture is also drawn, said heating and mixing section having a plurality of passages therethrough of convergent-divergent cross section with imperforate walls and with passages for heating medium around each passage;
   tubes supplied with heated fluid connected to said passages for heating medium;
   and an outlet portion leading the heated and mixed fuel mixtures to the engine inlet manifold.

2. A device as set forth in claim 1 and in addition comprising: a tank containing a supply of chemical solution effective to cause dissociation of harmful into harmless agents carried in the fuel mixture, and a tube connecting said tank with a chamber within said housing.

3. A device as set forth in claim 2 in which said chemical solution contains copper oxide.

4. A device as set forth in claim 1 and in which the convergent and divergent portions of the passage provide a throat having a sharp peripheral juncture at the meeting of said portions.

5. A device as set forth in claim 1 comprising:
   a first expansion chamber in said housing receiving fuel and air mixture from the carburetor, a fuel atomizing and heating section, and a second expansion chamber downstream of said fuel atomizing and heating section;
   tubes circulating fluid heated by the engine through said mixture atomizing and heating section;
   a conduit connecting the engine crankcase and said second expansion chamber;
   and a conduit connecting said second expansion chamber of the housing to the engine inlet.

6. A device effective to provide improved combustion in internal combustion engine comprising: a housing interposed in the conduit between the engine carburetor and engine inlet, said housing having a first expansion chamber receiving fuel and air mixture from the carburetor, a fuel atomizing and heating section, and a second expansion chamber downstream of said fuel atomizing and heating section; tubes circulating fluid heated by the engine through said mixture atomizing and heating sections; a conduit connecting the engine crankcase and said second expansion chamber; and a conduit connecting said second expansion chamber of the housing to the engine inlet.

7. A device as set forth in claim 6 and in addition comprising: a tank containing a chemical additive effective to cause dissociation of harmful into harmless agents carried in the fuel mixture and a tube connecting said tank with said first expansion chamber.

8. A device as set forth in claim 7 and in which said tank contains a suspension of finely ground copper oxide in water.

9. A device as set forth in claim 6 and in addition comprising: a plurality of passages arranged in side by side relation having convergent-divergent portions meeting at a sharp angle and having imperforate walls connecting said first to said second expansion chamber, the turbulent flow through said passages being effective to cause thorough mixture of the flow of fuel and air, and further means to cause turbulent flow of mixture flowing through the second expansion chamber and said conduit into the engine.

10. A device as set forth in claim 6 and in addition comprising: a valve operated by the throttle control of the engine, said valve controlling the flow of fumes and air from the crankcase to said second expansion chamber and means to adjust said valve to remain part way open when the engine is idling.

11. A method for improving combustion in automotive engines and reducing deleterious products in the exhaust thereof comprising: adding finely ground copper oxide suspended in water into a closed path for the flow of mixed fuel and air between the carburetor and engine intake; heating said mixture with the copper oxide and water; and subjecting said latter mixture to violent fluctuations in pressure and direction of flow to produce thorough commingling of the mixture before delivery into the engine intake.

12. A method as set forth in claim 11 and in addition introducing crankcase fumes and air into said closed path after the heating and commingling of the finely ground copper oxide, fuel, and air, and before delivery into the engine intake.

13. A method as set forth in claim 11 and in addition introducing crankcase fumes and air into said closed path after the heating and commingling of the finely ground copper oxide, fuel, and air, and subjecting the mixture with the crankcase fumes and air to turbulent flow through said path before delivery into the engine intake.

References Cited in the file of this patent
UNITED STATES PATENTS 1,680,373　　Francis _____ Aug. 14, 1928